Figure 1:
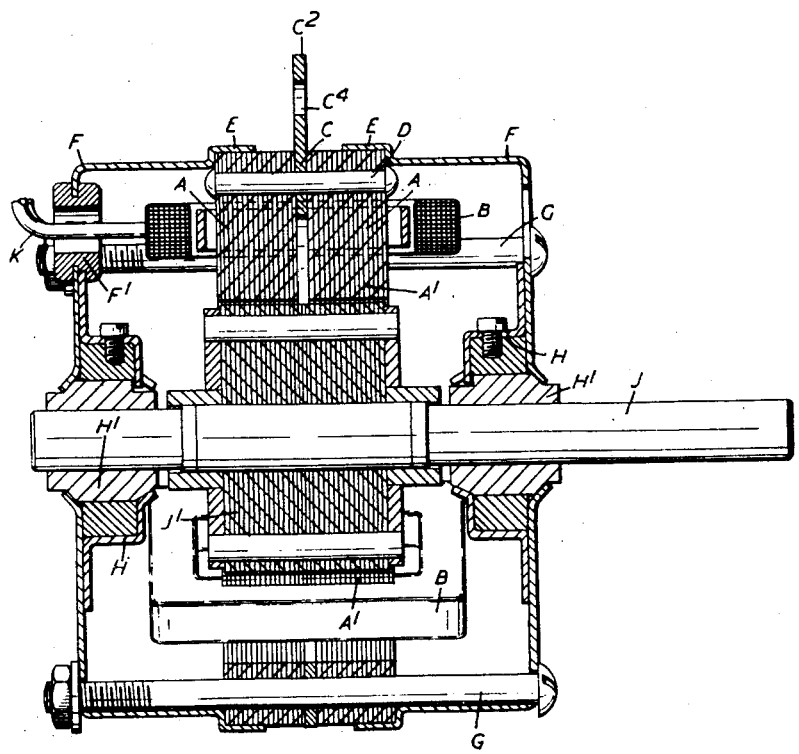

Nov. 29, 1949  A. W. WHITE  2,489,840
DYNAMOELECTRIC MACHINE FIELD CORE
Filed Sept. 18, 1946  2 Sheets-Sheet 1

Inventor
Adam Watson White
by
Harry S. Dumarr
Attorney

Nov. 29, 1949 A. W. WHITE 2,489,840
DYNAMOELECTRIC MACHINE FIELD CORE
Filed Sept. 18, 1946 2 Sheets-Sheet 2
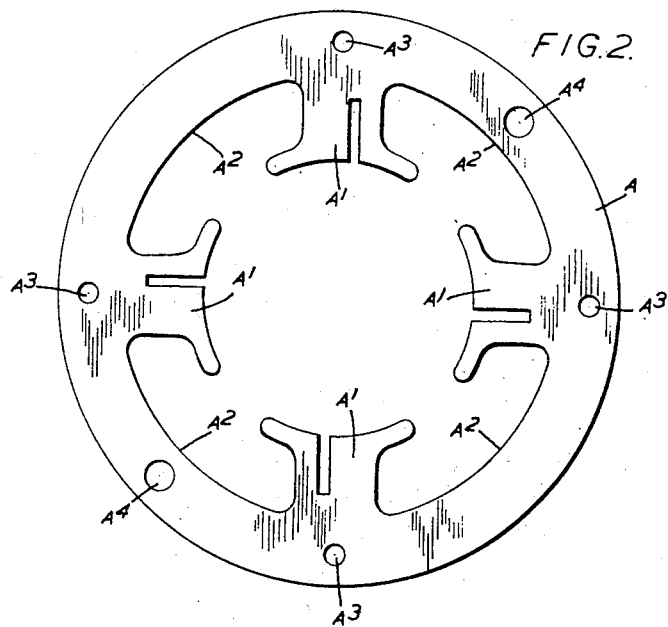
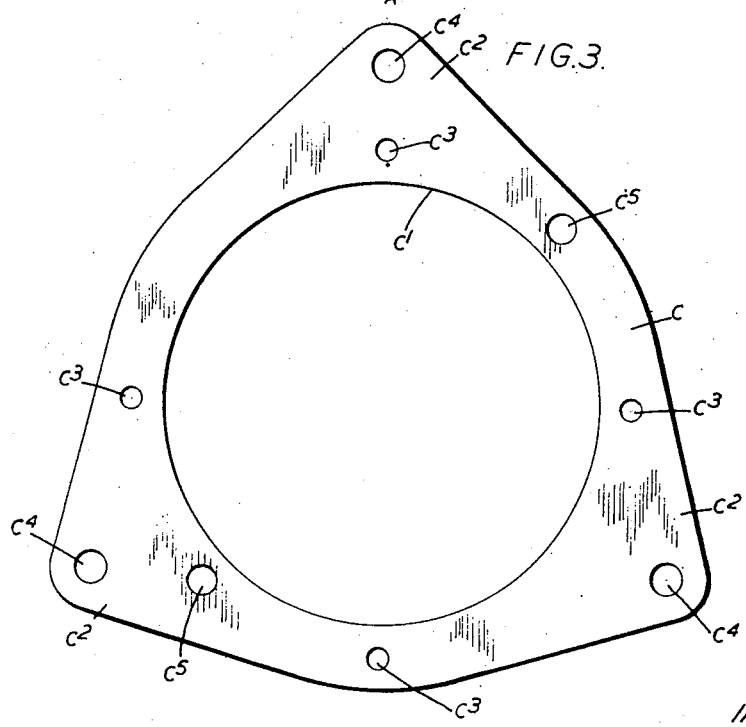
Inventor
Adam Watson White
by
Harry S. Demarre
Attorney Patented Nov. 29, 1949

2,489,840

UNITED STATES PATENT OFFICE 2,489,840

DYNAMOELECTRIC MACHINE FIELD CORE

Adam Watson White, Ruislip, England, assignor to The Hoover Company, North Canton, Ohio, a corporation of Ohio Application September 18, 1946, Serial No. 697,707
In Great Britain October 4, 1945

2 Claims. (Cl. 171—252)

This invention relates to rotary electric motors, dynamos and like dynamo-electric machines of the kind having the field core formed from a stack of similar plates, usually referred to as laminations, clamped together by rivets, bolts or the like passing through them and has for its object to provide an arrangement which will be simple and inexpensive to make and enable the dynamo-electric machine to be supported in a simple and satisfactory manner.

To this end according to the present invention the stack of plates constituting the field core of an electric motor, dynamo or the like of the kind referred to includes one or more plates having a flange or lugs extending radially outwards beyond the remainder of the stack and constituting the means for supporting the motor, dynamo or the like. In some cases, two or more such supporting plates may be provided at different points in the length of the stack. It will however usually be preferred to provide a single supporting plate, which is then conveniently disposed approximately in the centre of the stack and is of greater thickness than the other plates in the stack. In such an arrangement the supporting plate may be, as is usually preferred, a single piece plate of appropriate thickness, or may be formed from two or more thinner plates placed face to face.

Further the supporting plate or plates may or may not conform internally to the internal contour of the remaining plates, and, especially when formed of thicker material than the remaining plates may thus not conform to the internal contour of the latter, being for example of circular internal contour so as to facilitate their manufacture in such thicker material. In any case the internal contour of the supporting plate or plates is preferably such that it nowhere extends beyond the inner contour of the remaining plates which are usually provided with internal projections constituting the pole pieces of the field core.

The invention may be carried into practice in various ways but one construction according to the invention is illustrated by way of example in the accompanying drawings, in which Figure 1 is a sectional side elevation of the motor, Figure 2 is a front elevation of one of the plates constituting the field core including the pole pieces thereof, and Figure 3 is a similar view to Figure 2 of the supporting plate.

In the construction shown in the drawings the motor comprises a field core built up from a stack of similar plates A each having a number of internal projections $A^1$ together constituting the pole pieces of the core on which the field coils B are wound. Disposed in approximately the centre of the stack is a supporting plate C of thicker metal than the plates A and having a circular internal contour $C^1$ of approximately the diameter of the parts $A^2$ of the internal contour of the plates A which lie between the pole piece projections $A^1$. The plate C is formed externally as shown to provide three lugs $C^2$ extending outwardly beyond the circular external contour of the plates A. A series of rivets D pass longitudinally through holes $A^3$, $C^3$ in the complete stack of plates A and C and clamp the plates together while the lugs $C^2$ have holes $C^4$ to receive supporting bolts, rivets or the like.

Engaging the end of the stack of plates A, C and conveniently located by spigot joints E relatively thereto are two cup-like end caps F which leave the centre part of the stack exposed and are held in place by two through bolts G passing through them and through holes $A^4$, $C^5$ in the plates A and C.

The end caps F may be formed for example as metal pressings, plastic mouldings or die castings and carry housings H in which are secured bearings $H^1$ which carry the shaft J of a rotor or armature $J^1$ arranged to rotate within the field core. One of the end caps F conveniently has an opening $F^1$ through which the current carrying conductors K pass.

Usually the supporting plate or plates in a dynamo-electric machine according to the present invention will be formed of steel, soft iron or other electromagnetic material but when the invention is applied for example to a two-part machine such as a rotary converter in which it is desired to insulate electromagnetically two parts of the field core from one another, the supporting plate may be of some non-magnetic material and can serve to effect or assist in such magnetic insulation.

What I claim as my invention and desire to secure by Letters Patent is:

1. A dynamo-electric machine comprising a field core provided with projections forming pole pieces, and support means forming part of said field core and having its inner periphery contoured so as not to conform with said projections forming said pole pieces, said support means extending beyond said field core to provide a support for the latter.

2. A dynamo-electric machine comprising a field core formed from a stack of annular laminations and having inwardly projecting portions defining pole pieces, support means forming part of said laminations and contoured so as not to extend inwardly of said projecting portions forming said pole pieces, said support means extending beyond the exterior of said field core to provide a support for the latter.

ADAM WATSON WHITE.

REFERENCES CITED

The following references are of record in the file of this patent:

UNITED STATES PATENTS

| Number | Name | Date |
| --- | --- | --- |
| 1,211,612 | Miller | Jan. 9, 1917 |
| 1,511,345 | Kaisling | Oct. 14, 1924 |
| 1,808,778 | Jones | June 9, 1931 |